United States Patent Office 2,879,250
Patented Mar. 24, 1959

2,879,250

POLYURETHANE RESIN CROSSLINKED WITH POLYTHIOETHER AND VINYLIDENE MONOMER AND PROCESS OF MAKING SAME

Karl-Heinz Eisenmann, Koln-Stammheim, Gunther Nischk, Leverkusen, and Hans Holtschmidt, Koln-Stammheim, Germany, assignors to Farbenfabriken Bayer Aktiengesellschaft, Leverkusen, Germany, a corporation of Germany No Drawing. Application August 13, 1956
Serial No. 603,808

Claims priority, application Germany August 19, 1955

6 Claims. (Cl. 260—45.4)

This invention relates to new cross-linked plastics and a method for preparing the same. More particularly, the invention is concerned with highly cross-linked plastics obtained by reacting copolymerizable unsaturated polyisocyanates with polymerizable vinyl compounds and polythioethers containing terminal hydroxyl groups.

It is known to copolymerize unsaturated polyesters with polymerizable vinyl compounds, such as styrene, methacrylic acid esters and phthalic diallyl ester. However, owing to the great number of ester bonds in the products thus obtained, the latter are more or less unstable to hot water so that, for example, the mechanical values drop to one-tenth of the original values after exposure to water at 90° C. for 30 days. It is also known that the resistance of such copolymers to hot water can be improved by the provision of additional bonding points in the cross-linked plastic. Thus, it has been proposed to react unsaturated hydroxyl polyesters with polymerizable vinyl compounds and saturated polyisocyanates. In this reaction, there take place a copolymerization as well as a polyaddition of the ester chains with one another. The formation of urethane linkages results in a substantial reduction of the ester groups in the copolymer whose resistance to water is thereby improved.

It is an object of the present invention to provide new cross-linked plastics which are stable to hydrolytic degradation. Another object is to provide cross-linked plastics which exhibit excellent mechanical properties. A further object is to provide cross-linked plastics containing no ester groups or only an amount of ester groups which can be neglected. A still further object is to provide a process for preparing the new cross-linked plastics in a simple and economical manner. Still further objects will appear hereinafter.

These objects are accomplished in accordance with the present invention by reacting a copolymerizable unsaturated polyisocyanate with a polymerizable vinylidene monomer and a polythioether containing terminal hydroxyl groups in the presence of a polymerization catalyst.

It is believed that two reactions are responsible for the formation of the new cross-linked plastics of the instant invention: The isocyanate groups of the unsaturated polyisocyanate react, with hydrogen displacement, with the hydroxyl groups of the polythioethers and form three-dimensional cross-linked structures. At the same time, due to the presence of the polymerization catalyst, there takes place a copolymerization with the vinylidene monomer so that a highly cross-linked end product is obtained.

Among the copolymerizable unsaturated polyisocyanates which can be used in the practice of the invention are unsaturated aliphatic, cycloaliphatic and aromatic di- and triisocyanates. A preferred group of copolymerizable unsaturated polyisocyanates comprises short-chained unsaturated isocyanate polyesters obtained by reacting an aliphatic, cycloaliphatic or aromatic diisocyanate with an unsaturated hydroxyl polyester.

Unsaturated hydroxyl polyesters suitable for use in the production of short-chained unsaturated isocyanate polyesters are obtained in known manner by thermal esterification of unsaturated dicarboxylic acids with polyhydric alcohols at temperatures ranging from about 150° C. to about 220° C. In the esterification, an excess of the polyhydric alcohol component is used so as to obtain an unsaturated polyester having terminal hydroxyl groups. The molecular weight of the polyester can vary within wide limits, but in most cases it will be within the range of about 250 to 4,000. In order to produce the short-chained unsaturated isocyanate polyesters, the unsaturated polyesters are reacted with a polyisocyanate, preferably a diisocyanate, in an amount in excess over that calculated on the terminal hydroxyl and carboxyl groups contained in said unsaturated polyesters. In this manner, unsaturated structures are formed which contain terminal isocyanate groups. Depending upon the excess of diisocyanate employed in the reaction, unsaturated isocyanate polyesters of different chain lengths are obtained. When using an excess of 100% diisocyanate, the addition product will contain free isocyanate groups as terminal groups, but its molecular weight will not be substantially changed.

Among the polymerizable vinylidene monomer which can be used in the practice of the invention are styrene, methyl methacrylate, divinyl benzene, phthalic diallyl ester and cynanuric diallyl ester.

Illustrative examples of hydroxyl polythioethers which are suitable for use in the process of the invention include the reaction products of polyhydric alcohols with thioether glycols. They may be obtained by reacting a polyhydric alcohol with a thioether glycol in a molar ratio within the range of about 1:1 to about 1:1.5, using temperatures ranging from about 100° to about 300° C. and a dehydration catalyst, such as an aliphatic or aromatic sulfonic acid. Another method of producing suitable hydroxyl polythioethers is the etherification of compounds of the general formula $$HO—R—(S—R')_n—S—R'—XH$$

in which R is ethylene or propylene, R' is a divalent organic radical, the carbon chain of which may be interrupted by hetero atoms such as O and S, it further may be branched and the branchings may have terminal XH groups, $n$ is an integer and X is oxygen or sulfur. Such a compound can be self-condensed or condensed with another polyhydric alcohol or thioether alcohol to give a suitable hydroxyl polythioether.

Thioether glycols which may be employed in the production of the above polythioethers include thiodiglycol, 3,3'-dihydroxydipropyl sulfide, 1,4-(β-hydroxylethyl)-phenylene dithioether, etc. As polyhydric alcohols which may be reacted with these or analogous thioether glycols to form hydroxyl polythioethers, there may be mentioned glycol, butanediol, hexanediol, trimethylol propane, hexanetriol, the 4,4'-di(β-hydroxyethyl ester) of 4,4'-dihydroxydiphenyl-dimethyl methane, 1,4-bis-hydroxymethyl benzene, 2,5-bis-hydroxymethyl-p-xylene, etc. The components of the hydroxyl polythioethers are preferably used in such a ratio as to obtain end products having an hydroxyl number within the range of about 30 to about 400.

If small amounts of α-β-unsaturated dicarboxylic acids are added to the components of the hydroxyl polythioethers, the reaction products will contain a small amount of unsaturated groups and these groups can also participate in the copolymerization.

The unsaturated polyisocyanates and the OH-groups containing polythioethers are employed in equivalent or nearly equivalent amounts calculated on the reaction between the NCO-groups and the OH-groups. The polymerizable vinyl compound is used in an amount of about 10 to about 60% compared with the sum of polyisocyanate and polythioether.

Among the polymerization catalysts which can be used in the practice of the invention are all catalysts commonly used in polymerization and copolymerization reactions of the present type, representative examples of suitable catalysts including organic peroxides and Redox systems comprising the latter, for example benzoyl peroxide, cumol peroxide, cyclohexanon peroxide with cobalt-II-salts, cyclohexanon peroxide with morpholine salt of benzene sulfinic acid, cyclohexanon peroxide with dicyclohexyl amine salt of p-toluene sulfinic acid, benzoyl peroxide with p-methyl dimethyl aniline, benzoyl peroxide with permaleic acid ester.

In a specific embodiment of the process of the invention, a polymerization catalyst is added to a mixture obtained from a solution comprising an hydroxyl polythioether and a polymerizable vinyl compound and a solution comprising another portion of said polymerizable vinyl compound and a copolymerizable unsaturated polyisocyanate.

Particularly valuable products are obtained if the copolymerization in accordance with the present invention is carried out in the presence of fillers, such as chalk and sand, or fibers, such as glass fibers, asbestos fibers and the like.

The new cross-linked copolymers of the instant invention can find many applications. Thus, they may be used in the manufacture of radar housings, wireless sets or similar housings for electrical equipment. They may be further employed for refrigerators, washers, containers and other household goods. The new copolymers are equally useful for industrial equipment, e.g. helmets in the mining industry or chemical apparatus, for instance acid resistant tubes or vessels.

The invention is further illustrated but not limited by the following examples, in which parts and percentages are by weight.

EXAMPLE 1

*Solution A*

854 parts of thiodiglycol,
2212 parts of 4,4'-di-($\beta$-hydroxyethyl ether) or 4,4'-dihydroxydiphenyl-dimethyl methane,
586 parts of trimethylol propane, and
20.6 parts of p-toluene sulfonic acid methyl ester are condensed at 160° C. until an hydroxyl number of approximately 200 is reached. The hydroxyl polythioether thus obtained is dissolved in styrene, so that a 70% solution is obtained.

*Solution B*

600 parts of an unsaturated polyester, which is obtained by the thermal esterification at 200° C. of
1 mol of adipic acid,
2 mols of maleic anhydride,
4 mols of glycol, and which has an hydroxyl number of 300 and an acid number of approximately 6, are mixed by stirring at room temperature with 1.8 parts by weight of quinhydrone and 570 parts by weight of toluylene diisocyanate. The temperature rises gradually to 100° C. The mixture is then stirred for 30 minutes at 120° C. and thereafter 505 parts by weight of styrene are added.

2% of benzoyl peroxide paste and 0.1% of mono-t-butyl permaleinate are added to the mixture of 35 parts by weight of solution A and 65 parts by weight of solution B. This mixture polymerizes at 70° C. in a water bath within 60 minutes. The mixture is then heated for 2 hours at 120° C. The product is a clear yellowish to brown resin which may be molded to acid resistant tubes. It has the following mechanical properties:

| | |
|---|---|
| Impact strength kg. cm./cm.² | 10 |
| Notched bar toughness kg. cm./cm.² | 2–3 |
| Bending strength kg./cm.² | 1670 |
| Tensile strength kg./cm.² | 950 |
| Brinell hardness 10 secs. kg./cm.² | 1170 |
| ° Martens ° C. | 71 |

Equally good results are obtained if 1% of benzoyl peroxide paste, 2% of mono-t-butyl peroxide and 1% of p-toluene sulfinate of dicyclohexylamine are added to the mixture indicated above in place of benzoyl peroxide paste and mono-t-butyl permaleinate. It is then even possible for hardening to take place at room temperature.

EXAMPLE 2

*Solution A*

854 parts of thiodiglycol,
360 parts of butylene glycol-1,4,
948 parts of di-($\beta$-hydroxyethyl ether) of 4,4'-dihydroxy-diphenyl-dimethyl methane,
586 parts of trimethylol propane, and
20.6 parts of p-toluene sulfonic acid methyl ester are condensed at 160° C. until an hydroxyl number of approximately 190 is reached. 70 parts of the hydroxyl polythioether thus obtained are dissolved in 30 parts of styrene.

37.5 parts by weight of this solution are mixed with 62.5 parts by weight of the solution B which is described in Example 1. After adding 2% of benzoyl peroxide paste and 0.1% of mono-t-butyl permaleinate, polymerization takes place for 1 hour at 70° C. After heating for 2 hours at 120° C., a clear yellowish brown resin with excellent properties is obtained, useful for molding purposes in the manufacture of wireless sets.

EXAMPLE 3

*Solution A*

1106 parts of di-($\beta$-hydroxyethyl ether) of 4,4'-dihydroxyphenyl-dimethyl methane,
426 parts of thiodiglycol,
293 part of trimethylol propane,
98 parts of maleic anhydride,
10.3 parts of p-toluenesulfonic acid methyl ester are condensed at 160° C. to an hydroxyl number of approximately 155. 70 parts of the hydroxyl polythioether thus obtained are dissolved in 30 parts of styrene.

60 parts by weight of the solution B described in Example 1 are added to 40 parts of the above solution A, and then 2% of benzoyl peroxide paste and 0.1% of mono-t-butyl permaleinate are added. At 70° C., this mixture hardens within 60 minutes, and after heating for 2 hours at 120° C., a clear yellowish brown resin is obtained with good strength properties, well suited for cooling containers.

EXAMPLE 4

*Solution A*

854 parts of thiodiglycol,
360 parts of butylene glycol-1,4,
948 parts of di-($\beta$-hydroxyethyl ether) of 4,4-dihydroxydiphenyl-dimethyl methane,
586 parts of trimethylol propane, and
20.6 parts of p-toluene sulfonic acid methyl ester are condensed at 160° C. until an hydroxyl number of approximately 190 is reached. 70 parts of the hydroxyl polythioether thus obtained are dissolved in 40 parts of methyl methacrylate.

37.5 parts by weight of this solution are mixed with 62.5 parts by weight of the solution B which is described in Example 1. After adding 2% of benzoyl peroxide paste and 0.1% of mono-t-butyl permaleinate, polymerization takes place for 1 hour at 70° C. After heating for 2 hours at 120° C., a clear yellowish brown resin with excellent properties is obtained, useful for molding purposes in the manufacture of radar housings.

EXAMPLE 5

*Solution A*

1106 parts of di-(β-hydroxyethyl ether) of 4,4'-dihydroxyphenyl-dimethyl methane,
426 parts of thiodiglycol,
293 parts of trimethylol propane,
98 parts of maleic anhydride,
10.3 parts of p-toluenesulfonic acid methyl ester are condensed at 160° C. to an hydroxyl number of approximately 155. 70 parts of the hydroxyl polythioether thus obtained are dissolved in 35 parts of diallyl phthalate.

60 parts by weight of the solution B described in Example 1 are added to 40 parts of the above solution A, and then 2% of benzoyl peroxide paste and 0.1% of mono-t-butyl permaleinate are added. At 70° C., this mixture hardens within 60 minutes, and after heating for 2 hours at 120° C., a clear yellowish brown resin is obtained with good strength properties, well suited for acid resistant linings of reaction vessels.

Obviously many modifications and variations of the invention, as hereinbefore set forth, may be made without departing from the spirit and scope thereof and therefore only such limitations should be imposed as are indicated in the appended claims.

What is claimed is:

1. A method for making plastics which comprises reacting in the presence of a polymerization catalyst containing an organic peroxide, an (1) unsaturated polyisocyanate prepared by reaction of a polyester having terminal hydroxyl groups and prepared by esterification of an ethylenically unsaturated dicarboxylic acid and a polyhydric alcohol in admixture in a ratio of less than one mol acid per mol alcohol, with an organic polyisocyanate present in excess over that required to react with all of said hydroxyl groups, (2) an hydroxyl terminated polythioether having an hydroxyl number of from about 30 to about 400 in an amount substantially equivalent to that required to react with all of the —NCO groups of said unsaturated polyisocyanate, and (3) from about 10 percent to about 60 percent of a vinylidene monomer based on the amount of unsaturated polyisocyanate and polythioether.

2. A plastic prepared by reacting in the presence of a polymerization catalyst containing an organic peroxide, (1) an unsaturated polyisocyanate prepared by reacting a polyester having terminal hydroxyl groups and prepared by esterification of an ethylenically unsaturated dicarboxylic acid and a polyhydric alcohol in admixture in a ratio of less than one mol acid per mol alcohol, with an organic polyisocyanate present in excess over that required to react with all of said hydroxyl groups, (2) an hydroxyl terminated polythioether having an hydroxyl number of from about 30 to about 400 in an amount substantially equivalent to that required to react with all of the —NCO groups of said unsaturated polyisocyanate and (3) from about 10 percent to about 60 percent of a vinylidene monomer based on the amount of unsaturated polyisocyanate and polythioether.

3. The process of claim 1 wherein said vinylidene monomer is styrene.

4. The process of claim 1 wherein said catalyst is a mixture of benzoyl peroxide and mono-t-butyl permaleinate.

5. The process of claim 1 wherein said catalyst is a mixture of benzoyl peroxide and mono-t-butyl peroxide and dicyclohexylamine p-toluene sulphinate.

6. The process of claim 1 wherein said unsaturated polyisocyanate and polythioether are dissolved in the said vinylidene monomer and then mixed together.

References Cited in the file of this patent

UNITED STATES PATENTS

| | | |
|---|---|---|
| 2,411,954 | Burke | Dec. 3, 1946 |
| 2,591,884 | Simon et al. | Apr. 8, 1952 |
| 2,642,403 | Simon et al. | June 16, 1953 |
| 2,729,618 | Muller et al. | Jan. 3, 1956 |
| 2,780,613 | Rubens | Feb. 5, 1957 |